US007653590B1

(12) United States Patent  (10) Patent No.: US 7,653,590 B1
Kroon et al.  (45) Date of Patent: Jan. 26, 2010

(54) SYSTEM AND METHOD FOR OVERTURNING OF RISK EVALUATION PERFORMED BY RISK MODEL TO CONTROL FINANCIAL RISK (75) Inventors: Thad Kroon, Houston, TX (US); Charles McGinnis, Houston, TX (US)

(73) Assignee: First Data Corporation, Greenwood Village, CO (US)

(*) Notice: Subject to any disclaimer, the term of this patent is extended or adjusted under 35 U.S.C. 154(b) by 1425 days.

(21) Appl. No.: 10/047,917

(22) Filed: Jan. 14, 2002

(51) Int. Cl.
*G06Q 40/00* (2006.01)
(52) U.S. Cl. .......................... 705/38; 705/30
(58) Field of Classification Search .............. 705/10–44
See application file for complete search history.

(56) References Cited

U.S. PATENT DOCUMENTS

| | | | |
|---|---|---|---|
| 4,727,243 A * | 2/1988 | Savar | 705/17 |
| 5,175,682 A | 12/1992 | Higashiyama et al. | |
| 5,237,159 A | 8/1993 | Stephens et al. | |
| 5,444,616 A | 8/1995 | Nair et al. | |
| 5,677,955 A | 10/1997 | Doggett et al. | |
| 5,679,938 A | 10/1997 | Templeton et al. | |
| 5,679,940 A * | 10/1997 | Templeton et al. | 235/380 |
| 5,691,524 A | 11/1997 | Josephson | |
| 5,703,344 A | 12/1997 | Bezy et al. | |
| 5,801,366 A | 9/1998 | Funk et al. | |
| 5,848,400 A | 12/1998 | Chang | |
| 5,848,412 A | 12/1998 | Rowland et al. | |
| 5,920,847 A | 7/1999 | Kolling et al. | |
| 5,930,777 A | 7/1999 | Barber | |
| 5,991,758 A | 11/1999 | Ellard | |
| 6,059,185 A | 5/2000 | Funk et al. | |
| 6,097,834 A | 8/2000 | Krouse et al. | |
| 6,105,011 A * | 8/2000 | Morrison, Jr. | 705/45 |
| 6,117,011 A | 9/2000 | Lvov | |
| 6,164,528 A | 12/2000 | Hills et al. | |
| 6,189,785 B1 | 2/2001 | Lowery | |
| 6,247,000 B1 | 6/2001 | Hawkins | |
| 6,411,942 B1 | 6/2002 | Fujimoto | |
| 6,430,539 B1 | 8/2002 | Lazaris et al. | |
| 6,647,376 B1 | 11/2003 | Farrar | |
| 6,658,393 B1 | 12/2003 | Basche et al. | |
| 6,757,664 B1 | 6/2004 | Cardinal et al. | |
| 6,839,682 B1 | 1/2005 | Blume et al. | |
| 6,856,965 B1 * | 2/2005 | Stinson et al. | 705/21 |
| 6,999,943 B1 | 2/2006 | Johnson et al. | |
| 7,080,049 B2 * | 7/2006 | Truitt et al. | 705/75 |
| 7,251,624 B1 | 7/2007 | Lee et al. | |

(Continued)

OTHER PUBLICATIONS

U.S. Appl. No. 10/041,765, filed Jan. 7, 2002, Ahles.

(Continued)

*Primary Examiner*—Frantzy Poinvil
(74) *Attorney, Agent, or Firm*—Sutherland Asbill & Brennan LLP (57) ABSTRACT

A risk assessment system and method that calculates the risk of approving certain financial transactions, such as payment by check, and provides an indication as to whether to accept or decline the check. The system and method further include a process for calculating the risk of overturning the original decision whereby indications of whether to overturn a particular original transaction decline can be provided to a customer service agent such that the overturn decision is based upon the calculation of overturn risk using one or more overturn scoring modules.

31 Claims, 5 Drawing Sheets

U.S. PATENT DOCUMENTS

| | | | |
|---|---|---|---|
| 7,333,953 | B1 | 2/2008 | Banaugh et al. |
| 2002/0032645 | A1 | 3/2002 | Nozaki |
| 2002/0040344 | A1 | 4/2002 | Preiser et al. |
| 2002/0116323 | A1 | 8/2002 | Schnall |
| 2002/0178112 | A1 | 11/2002 | Goeller et al. |
| 2003/0023557 | A1 | 1/2003 | Moore |
| 2003/0032645 | A1 | 2/2003 | Gilbert |
| 2003/0033252 | A1 | 2/2003 | Buttridge et al. |
| 2003/0093368 | A1 | 5/2003 | Manfre et al. |
| 2003/0217003 | A1 | 11/2003 | Weinflash |
| 2004/0034583 | A1 | 2/2004 | Lanier et al. |

OTHER PUBLICATIONS

U.S. Appl. No. 10/041,955, filed Jan. 7, 2002, Liversedge et al.
U.S. Appl. No. 10/302,051, filed Nov. 20, 2002, Templeton et al.
U.S. Appl. No. 10/302,745, filed Nov. 20, 2002, Templeton et al.
U.S. Appl. No. 10/302,770, filed Nov. 20, 2002, Templeton et al.
U.S. Appl. No. 10/302,779, filed Nov. 20, 2002, Templeton et al.
U.S. Appl. No. 10/302,780, filed Nov. 20, 2002, Templeton et al.
U.S. Appl. No. 10/302,796, filed Nov. 20, 2002, Templeton et al.
U.S. Appl. No. 60/332,046, filed Nov. 20, 2001, Barron.
Disclosure under 37 C.F.R. 1.56 dated Jun. 3, 2009, filed for U.S. Appl. No. 10/047,917.
Piskora, Beth. "Three big check acceptance companies sign up with fledgling verification outfit," American Banker, New York, NY, Jan. 30, 1996. vol. 161, Iss. 19. (3 pages).
Kumar, Ashok & Motwani, Jaideep. "Reengineering the lending procedure for small businesses: a case study". Work Study. London. 1999. vol. 48, Iss 1. (11 pages).
Morrison, Jeff. "Introducing C.A.R.T. to the forecasting process," The Journal of Business Forecasting, Spring 1998, pp. 9-12.

* cited by examiner

SYSTEM AND METHOD FOR OVERTURNING OF RISK EVALUATION PERFORMED BY RISK MODEL TO CONTROL FINANCIAL RISK

BACKGROUND OF THE INVENTION

1. Field of the Invention

This invention relates generally to risk assessment and, more particularly, to systems and methods of re-evaluating previous determinations of risk assessment in financial transactions.

2. Description of the Related Art

Most financial transactions involve a customer making a payment in exchange for goods and services from a merchant. Many times the payment is in promissory form that instructs the customer's bank to pay the merchant. A check is one example of such promissory form of payment. As is known, the funds promised by the check are sometimes not paid due to reasons such as insufficient funds in the customer's checking account, or fraud. Thus, the merchant is taking a risk whenever a check is received as payment.

Many merchants maintain local databases that include, for example, a list of check writers that have written bad checks in the past. Such databases may range from a simple list on paper for a small store owner to a computer network for a chain store. As is known in the industry, managing such databases require use of merchants resources that could otherwise be used more beneficially elsewhere. Moreover, these databases are limited in that they are generally only able to identify check writers who had previously written bad checks in the merchant's store but are generally unsuccessful in identifying check writers who have written bad checks elsewhere.

In order to manage financial transaction risk, many merchants subscribe to a check acceptance agency that assesses risk associated with financial transactions based upon previous financial transactions that customers engage in with a number of subscribing merchants. For a given transaction, a subscribed merchant sends a transaction approval request to the agency with information such as check amount, check identifying information, and information about the customer. The agency assesses the risk based upon previously accumulated data about the customer and generates a risk score based on the information received. The agency can then either approve or decline the transaction based upon the risk score. An example of these risk assessment agencies includes Telecheck.

The agency can offer a variety of risk assessment products to the merchants. These products can range from either a simple screening of the check to guaranteeing payment of the check by the agency.

Generally, the risk assessment that is being performed by the agency is done using mathematical algorithms that determine the risk based on statistical data about the customer, the transaction and the merchant without directly querying the check writer at that particular moment. Consequently, there are circumstances where the agency will decline to accept a check when circumstances are such that the risk associated with the transaction is comparatively small. For example, many check approval agencies decline checks based upon the age of the account. New accounts can be opened for fraudulent purposes hence the risk associated with accepting checks on new accounts is high. However, a customer who has recently moved to a new location may not actually pose a significant risk even though the account is new. When checks are declined, this creates problems for the merchant in that the merchant can no longer sell the good or service to the customer and can also result in the customer becoming embarrassed or upset.

In these circumstances, the customer may wish to contact the agency directly in order to protest the decline of their check. Unfortunately, present check approval agencies are often incapable of accurately determining whether the request by the customer to overturn the original decline is warranted in light of the new information in a consistent manner. Historically, agencies have not had rapid access to additional records which has resulted in the agency essentially taking the word of the customer that the decline was unwarranted. As a consequence, some agencies overturn declines primarily based upon the customer taking the step to contact the agency directly and complain about the original decline. Consequently, instances of fraud occur when customers write bad checks, are declined, and then contact the agency to complain resulting in unwarranted overturns of the decline.

A significant portion of the difficulty that the agency experiences is that the customer service representative that is answering the telephone is being forced to make a decision as to whether to overturn the original decline based primarily on the information that is being provided by the customer. If the customer is engaging in fraud or is being less than truthful, the customer may tell the customer service representative facts that cannot be verified that, if true, would lower the risk associated with the transaction. The customer service representative is thus often not able to distinguish between a legitimate circumstance for overturning an original decline and a fraudulent or risky circumstance for overturning an original decline.

Hence, there is a need for financial risk assessment agencies, such as check approval agencies, that are more capable of ascertaining whether to overturn a previous decline of a check or other service. To this end, there is a need for a risk assessment agency that is better able to query the customer during a request for an overturn and perform an updated risk assessment in order to ascertain whether to overturn the original decline.

SUMMARY OF THE INVENTION

The aforementioned needs are satisfied in one aspect by the system for re-evaluating risk in financial transaction of the present invention. This system includes a risk scoring engine that evaluates risk in an original financial transaction wherein a customer is attempting to pay for vendibles, such as goods or services or both, using a promissory payment such as a paper or electronic check. The risk scoring engine uses a first scoring model to assess the risk of the original financial transaction and it provides a signal indicating that the promissory payment by the customer in the original financial transaction is to be declined when the risk exceeds a pre-selected threshold. The system further includes a decision overturn engine that re-evaluates the decline using a second scoring model, wherein the overturn scoring engine classifies the risk of overturning the original decline and provides an overturn classification signal indicative thereof. The system preferably also includes a customer service module that receives the overturn classification signal from the overturn scoring engine and provides the signal to a customer service representative such that when the customer service representative receives a request to overturn the decline of the promissory payment in the original transaction, the customer service representative utilizes the overturn classification signal to decide whether to overturn the original decline.

In this way, the system is able to provide the customer service representative a framework for deciding whether to overturn the original decline using information other than what is being provided to the customer service representative by the customer. Consequently, the system is better able to provide an objective criteria for deciding whether to overturn an original decline.

In another aspect, the present invention comprises a method of evaluating the risk of accepting a promissory payment as payment for a vendible good or service. In this aspect, the method comprises transmitting transaction information from a point of sale to a risk scoring engine wherein the transaction information includes identifying information about the promissory payment. The method further includes evaluating the transaction information to assess the risk of accepting the promissory payment as payment for the vendible and declining to accept the promissory payment when the evaluation of the transaction information indicates that the assessed risk of accepting the promissory payment exceeds a selected threshold and transmitting the decline to accept the promissory payment to the point of sale. The method further includes performing a decision overturn evaluation using an overturn engine to classify the risk associated with overturning the original decline to accept the promissory payment and transmitting the classification of risk associated with overturning the original decline to a customer service representative so that when the customer service representative is contacted to overturn the original decline, the customer service representative can make the overturn decision based at least in part on the classification of risk performed by the overturn engine.

The method and system of these aspects of the present invention allow for the determination of a classification of the risk of overturning an original decision to decline to accept a promissory payment. This reduces the inaccuracies associated with making overturn decisions based solely on the information provided by the consumer. These and other objects and advantages will be more apparent from the following description taken in conjunction with the accompanying drawings.

DETAILED DESCRIPTION OF THE PREFERRED EMBODIMENT

Figure 1:
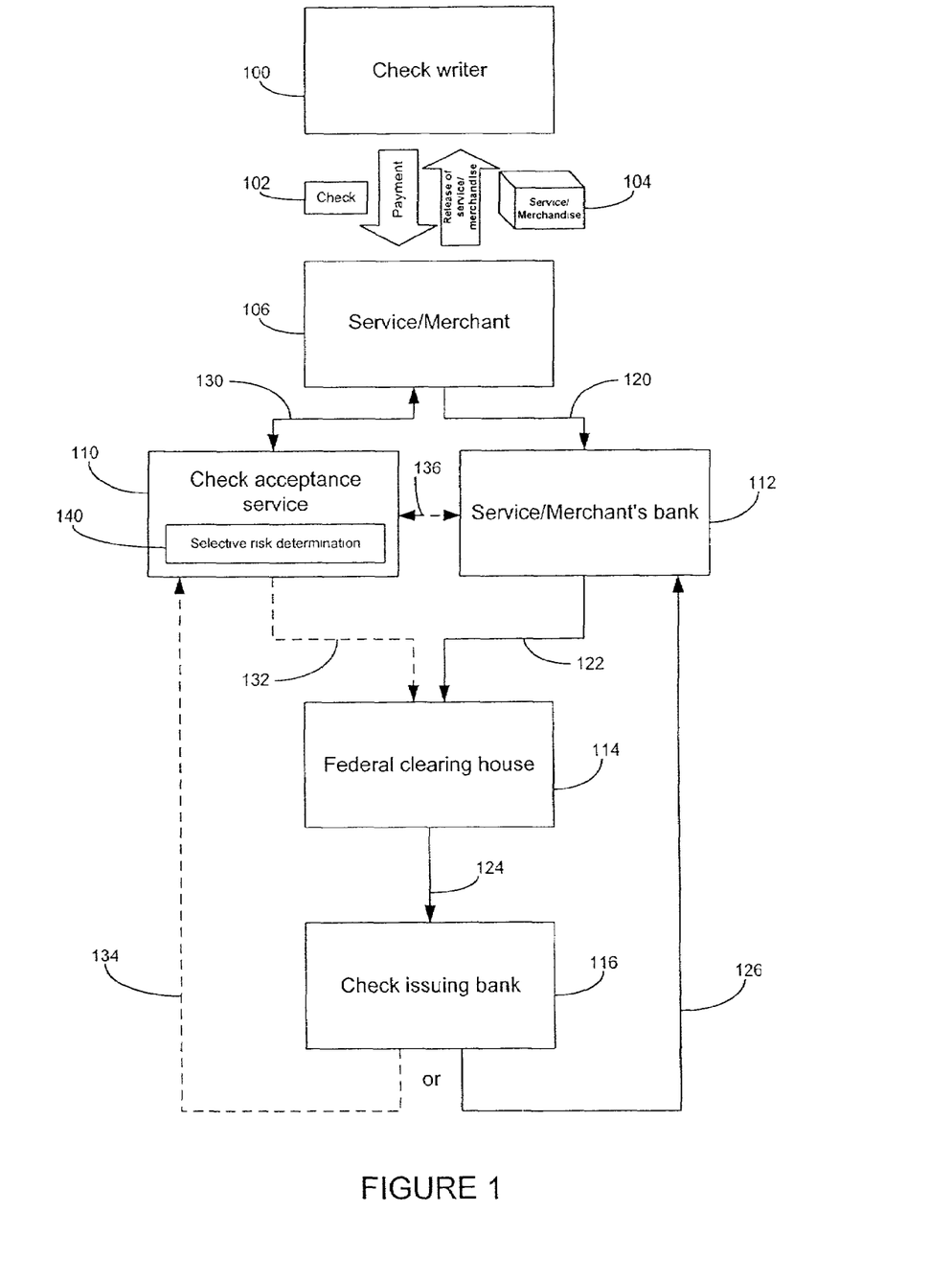
FIG. 1 illustrates a check transaction process, including a selected risk determination by a check acceptance service.

Reference will now be made to the drawings wherein like numerals refer to like parts throughout. FIG. 1 illustrates block diagram of a typical financial transaction involving a check. A check writer 100 writes a check 102 to a service/merchant 106 (referred to as merchant) in exchange for a vendible service/merchandise 104 (referred to as merchandise or vendible hereinafter). The check 102 may be accepted and deposited into a merchant's bank 112 without receiving any external authorization as indicated by path 120. Such a check 102 goes through a clearing process that is well known, wherein the merchant's bank 112 sends the check 102 to a federal clearing house 114 as indicated by path 122. The federal clearing house 114, in turn, sends the check 102 to the check issuing bank 116 as indicated by path 124. If the check 102 is considered to be valid, the check "clears" and the check's amount is debited from the checking account in the check writer's bank 116 and is then transferred to the merchant's bank 112, as indicated by path 126 to complete the transaction successfully.

In many transactions, however, the check 102 does not clear for various reasons, and the merchant's bank account is not credited with the check amount. Some of those reasons include non-sufficient fund (NSF) in the checking account, stop payment request by the check writer 100, and a fraudulent check. When the check 102 does not clear, the merchant 106 is left with the responsibility of collecting the proper funds or the merchandise 104 from the check writer 100. In many instances the merchant 106 is unsuccessful in such a collection process, and the already released merchandise is generally written off as a loss. Alternatively, even when the merchant 106 is successful in ultimately collecting the check amount, the merchant's costs associated with the transaction have been significantly increased. To reduce the chance of further loss from the same "bad" check writer, the check writer's name may be added to a negative list, which is in essence a local database. However, as discussed above, the local database offers only limited protection against check writers who have previously bounced checks in the merchant's establishment. Check writers who have not bounced checks in the merchant's establishment, but have a history of bouncing checks or writing fraudulent checks elsewhere are unlikely to be detected by such a local database.

As a consequence, many merchants decide to subscribe to and rely on a check acceptance service or agency 110 to manage risks associated with accepting checks from customers. The interaction between the merchant 106 and the check acceptance service 110 is indicated by path 130. The scope of service that the merchant 106 subscribes to varies, and three exemplary subscriptions are described below.

A first exemplary subscription comprises the check acceptance service 110 informing the merchant 106 to accept or refuse the check 102 based on the risk associated with the transaction. If the check is approved and accepted, the check 102 then goes through the clearing process via the merchant's bank 112 in a manner similar to that described above. The merchant, however, still assumes the risk associated with the transaction if the clearing process is not completed successfully.

A second exemplary subscription comprises the check acceptance service 110 guaranteeing the worthiness of the check 102 based on the risk associated with the transaction. The check 102 goes through the clearing process via the merchant's bank 112 in a manner similar to that described above. If the check 102 does not clear, however, the check acceptance service 110 pays the merchant 106 the check's amount, and assumes the responsibility of collecting from the check writer 100.

A third exemplary subscription comprises the check acceptance service 110 buying the check 102 outright from the merchant 106 based on the risk associated with the transaction. In such subscription, the transaction is complete, as far as the merchant 106 is concerned, when the merchant 106 accepts the check 102 upon approval from the check acceptance service 110. In many cases the check acceptance service 110 is electronically linked to the merchant's bank 112, as indicated by path 136, to transfer funds. The check acceptance service 110 assumes the responsibility of having the check 102 cleared. The check 102 is sent from the check acceptance service 110 to the federal clearing house 114 as indicated by path 132. The check 102 is then sent to the check issuing bank 116 as indicated by the path 124. If the check 102 is valid, fund is transferred from the check issuing bank 116 to the check acceptance service 110 as indicated by path 134, and the transaction is completed for the check acceptance service 110 as well. If the check 102 does not clear, the check acceptance service 110 assumes the responsibility of collecting from the check writer 100.

As is understood in the art, different subscriptions have different fee schedules that are generally determined by risks associated with the subscriptions. It will be appreciated that the success of the check acceptance service, including profitability, depends on accurately assessing risks associated with check related transactions. For example, if the check acceptance service gives wrong decisions to merchants that have the first exemplary subscription described above, the merchants may end up accepting high risk checks and/or refusing beneficial customers such that some dissatisfied merchants may discontinue the subscription. As for the exemplary subscriptions wherein the check acceptance service either guarantees or buys the checks, such as the second and third exemplary subscriptions described above, the risks assumed by the check acceptance service is directly related to the accuracy of risk assessments.

Figure 2:
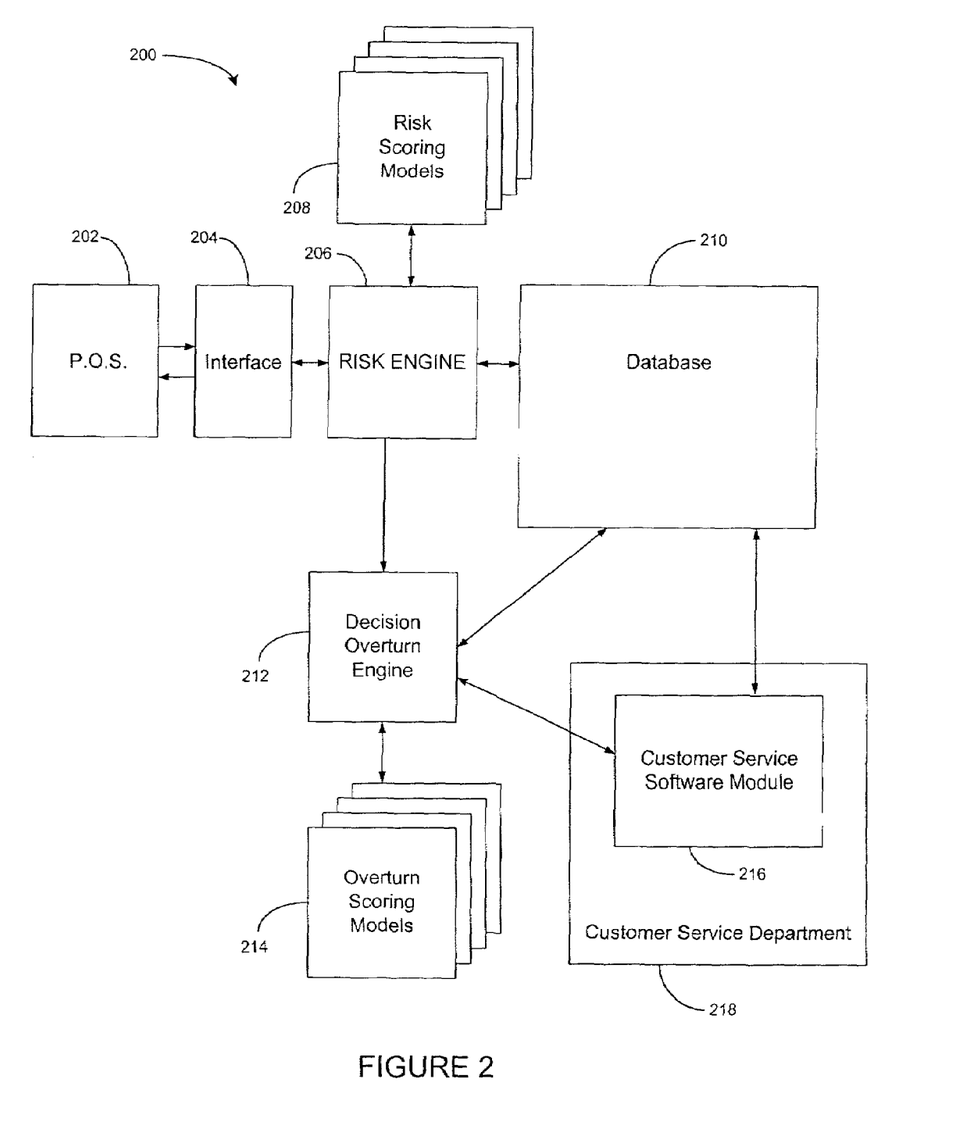
FIG. 2 is a functional block diagram of a risk assessment model that incorporates a decision overturn capability.

FIG. 2 is a block diagram that illustrates the components of the risk assessment system 200 with overturn capability of the preferred embodiment that is implemented by the agency 110. As is illustrated in FIG. 2, the risk assessment system 200 incorporates at least one point of sale device 202. The point of sale device is typically a scanning device which scans in the checks for subsequent transmission of information via an interface 204 to a risk engine 206. Typically, the point of sale device is located in each of the subscribing merchant locations and transmits identification information, such as MICR codes, transaction amount, and merchant identification information. The interface 204 is generally comprised of a telephonic, satellite or computer interface (such as an Internet interface) that is capable of transmitting the information to a central processor(s) that implements the risk engine 206.

As is understood in the art, the risk engine 206 accesses a plurality of scoring models 208 that receive the information transmitted from the point of sale device 202 via the interface 204 to determine a score which is indicative of the risk associated with a particular transaction. Based upon the merchant information, the customer identification, the transaction amount and other related factors, the risk engine 206 selects one of the plurality of scoring models 208 to obtain a mathematical assessment of the risk associated with a particular transaction.

As is understood, a very large number of scoring models 208 may be used by the risk engine 206 to evaluate the risk of any particular transaction being conducted at any particular point of sale device 202. In particular, the various functional types of scoring model types or models may be implemented as a neural network, a scorecard function, or any number of other possible implementations. In one embodiment of the invention, the risk engine 206 accesses approximately 1600 different scoring models where approximately 400 are neural network types and approximately 1200 are scorecard types. The risk scoring models then return a numeric risk value which is then used by the risk engine 206 to decide whether to approve or decline a particular transaction. The score and other information can then be stored in a database 210 for subsequent risk evaluation and overturn evaluations. The risk assessment can be performed in any of a number of known manners such as those disclosed in assignee's co-pending patent applications entitled SYSTEMS AND METHOD FOR SELECTIVE USE OF DATABASES TO PREDICT FINANCIAL RISK (U.S. patent application Ser. No. 10/041,955, filed Jan. 7, 2002) and SYSTEMS AND METHOD FOR SELECTIVE USE OF RISK MODELS TO PREDICT FINANCIAL RISK (U.S. patent application Ser. No. 10/041,765, filed Jan. 7, 2002) which are hereby incorporated by reference in their entirety.

The risk engine 206 upon making a determination as to whether to approve or decline a particular transaction, then sends the approval or decline information to the point of sale device 202 via the interface 204. In this way, the merchant is made aware as to whether the agency 110 has approved or declined the particular check transaction.

As will be discussed in greater detail below, this implementation of the risk assessment system 200 upon declining a particular transaction, activates a decision overturn engine 212. The decision overturn engine 212 is implemented by one or more processors, neural networks, or the like and it uses overturn scoring models 214 to determine a criteria as to whether the initial decline will be overturned when and if the customer contacts the customer service department 218 of the system 200. In one implementation, the decision overturn engine 212 performs a decision overturn process using the overturn scoring models 214 each time a transaction is declined and stores this information in the database 210. In another implementation, the decision overturn engine 212 only performs a decision overturn process using the overturn scoring models 214 when the customer takes the step to contact the customer service center 218. A customer service representative 216 can then initiate the process via the customer service software module 216 in a known manner.

Hence, the system 200 of the illustrated embodiment is capable of performing an overturn analysis making a risk factor based assessment as to the risk of overturning an original declined transaction thereby reducing the likelihood of loss due to customer service personnel overturns that are made using fewer or no risk assessment factors. The overturn process preferably reevaluates a number of factors that may have been evaluated in the original risk assessment of the transaction and evaluates them using a different model that is tailored to calculate the expected risk of overturning an original declined transaction. Moreover, the overturn scoring models 214 may also include additional variables that may not have been considered in the original transaction decision to determine what the risk is of overturning the decline of the original transaction decision.

Figure 3:
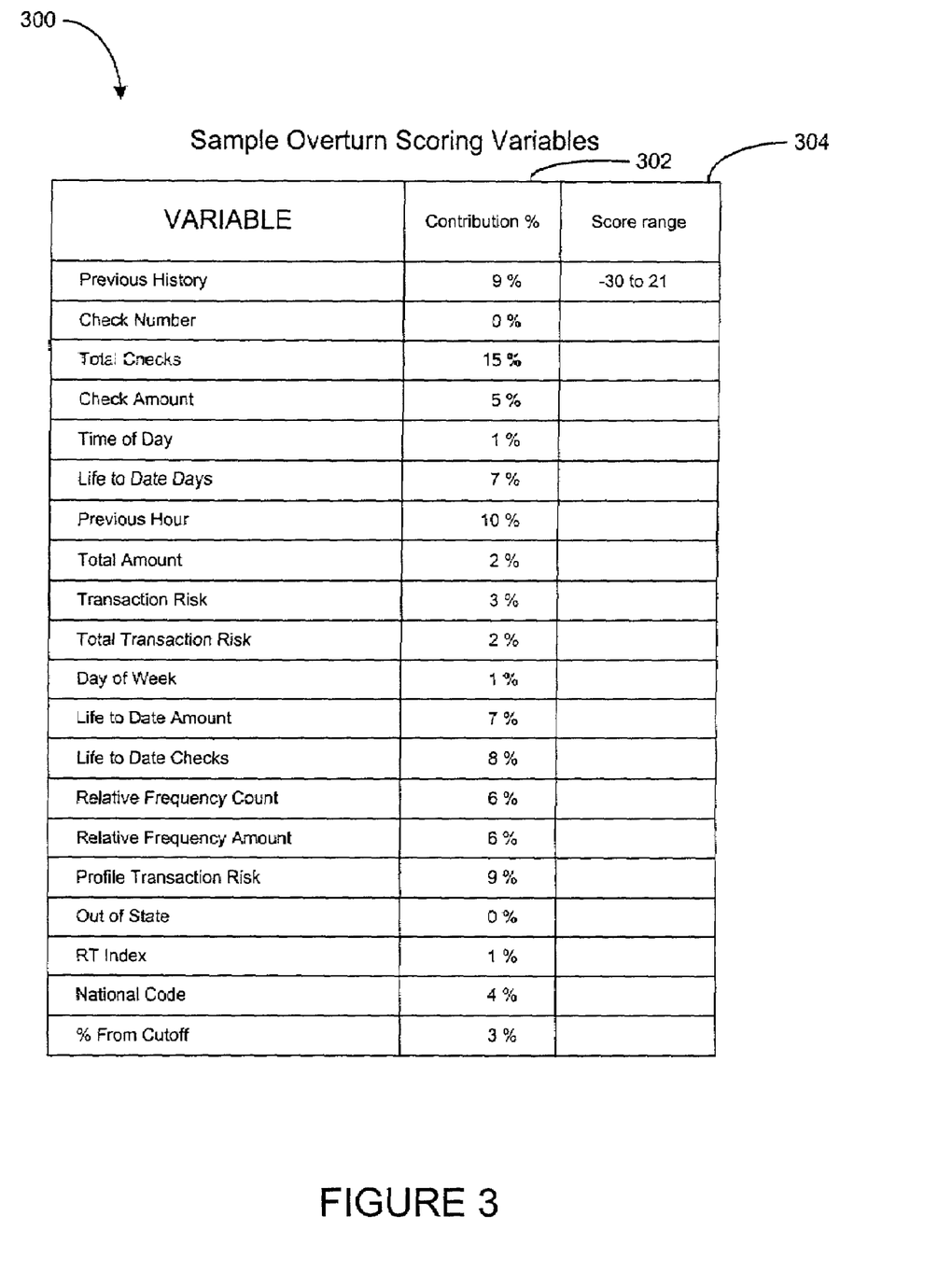
FIG. 3 is a table of exemplary decline overturn scoring variables.

FIG. 3 is a chart which illustrates some of the overturn scoring variables 300 used to make the overturn decision. Moreover, a weighting factor 302 may also be associated with the variables 300 in order to determine a score 304 that will be assigned to the value of each of the variables. The score can then be summed for each of the variables and the score can then be used to determine whether the original transaction decision should or should not be overturned if and when the customer contacts the customer service department 218.

As is illustrated in FIG. 3, a number of the variables, such as previous history, through national code, may be data variables that were determined for the original transaction decision. In particular, a number of variables are indicative of the instant declined transaction, such as the check number, the check amount, the time of day of the transaction, the day of the week, whether it is out of state etc. Larger checks or checks written at odd times may be more risky. Further, there are also variables such as transaction risk that are indicative of where the check is being written as checks written at low frequency locations e.g., liquor stores are more likely to be fraudulent checks than those written at high frequency locations, e.g., grocery stores where the customer shops frequently.

There are also a number of variables that are indicative of the past check writing performance of the customer. For example, the total number of checks written, the total amount of check written, the frequency count and frequency amount and checks written in the previous hour are all variables that are indicative of the customer's practice of writing checks that can be re-evaluated using the decision overturn model. The past pattern of check writing is used in a known manner to determine the risk associated with accepting a check or other promissory payment.

As indicated in FIG. 3, the variables are weighted and a score for each variable is then calculated using any of a number of known risk scoring models. The weighting is different for the overturn calculus as some of the variables can be found to be more indicative of the risk of overturning an original scoring decision. Moreover, additional variables, such as the percent from cut off variable, may be variables that are determined from the original transaction scoring process. The percent from cut off variable, in this particular implementation, is a percent variation between the actual original score received when the original transaction was subjected to the risk engine from the score needed for the transaction to be accepted.

The overturn scoring model 214 is formulated to calculate how close the score for the original transaction was to being accepted. Consequently, by weighting the variables differently, a mathematical assessment of the risk of overturning the original transaction can be compiled into a score which can either be transmitted directly to the customer service software module 216 or stored in the database 210 for use by the customer service department 218 upon subsequent contact by the customer.

Figure 4:
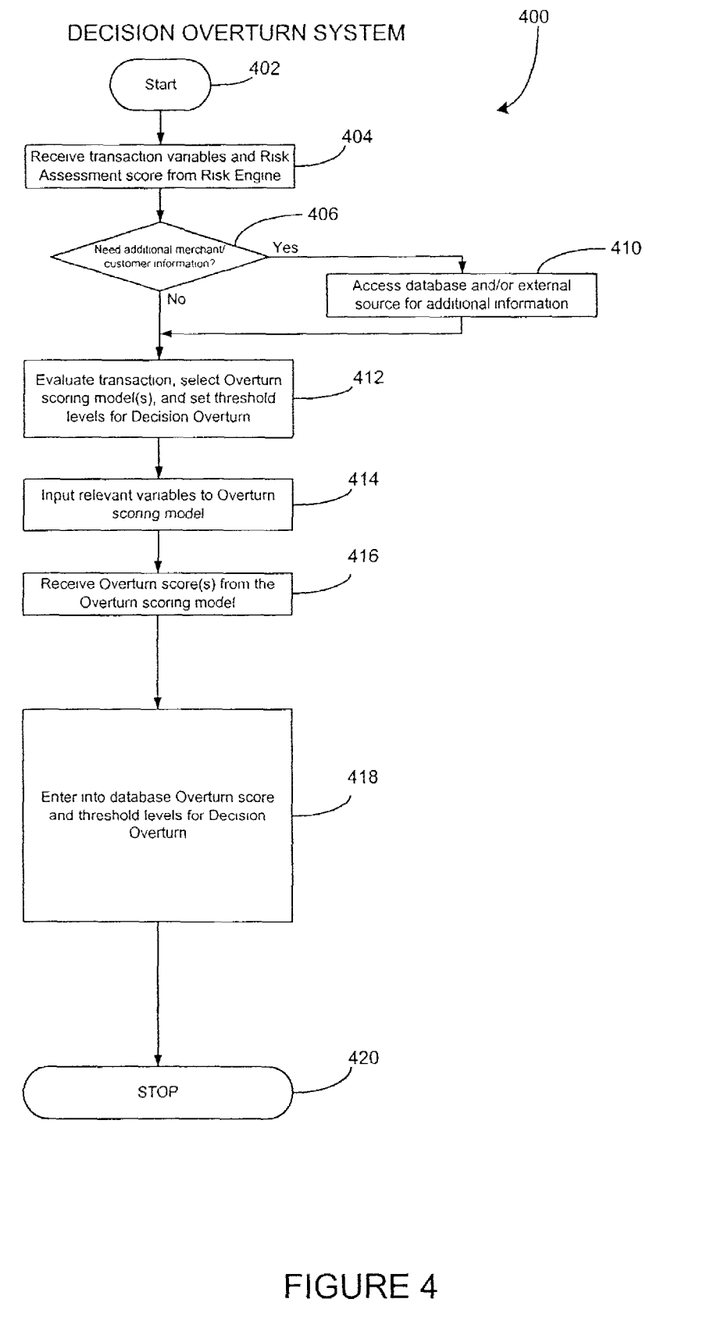
FIG. 4 is an exemplary flow chart illustrating a process by which the decision to decline an initial transaction can be evaluated before possibly being overturned.

FIG. 4 is a flow chart which illustrates the operation of the decision overturn engine 212 as it performs an exemplary decision overturn process 400. As is illustrated in FIG. 4, the decision overturn engine 212 from a start state 402 receives, in state 404, transaction variables and the risk assessment score of the original transaction from the risk engine 206. The overturn engine 212 then determines, in decision state 406, whether additional merchant and customer information is required. If additional information is required, the decision overturn engine 212 either accesses, in state 410, the database 210 and/or an external source for the additional information. Subsequently, the decision overturn engine 212, in state 412, evaluates the original transaction and selects an appropriate overturn scoring model 214. As is understood, a plurality of overturn scoring model may be selected based upon the type of transaction, the information about the particular customer, the information about the particular merchant, the value of the transaction, etc. The decision overturn engine 212 also sets, in state 412, a threshold level for a decision overturn. In one particular implementation, the threshold levels for the decision overturn comprise numerical scores that must be obtained in order for the overturn decision to fall within one of a plurality of different classifications that can be subsequently transmitted via the customer service module 216 to the customer service department 218.

The decision overturn engine 212 then inputs relevant variables to the overturn scoring model in state 414 in order for the overturn scoring model 214 to obtain an overturn score.

The decision overturn engine 212 then receives the overturn score 416 from the selected overturn scoring model 214 and, in one implementation, enters, in state 418, into the database 210 the overturn score and the calculated threshold levels for a decision overturn. Subsequently, the decision overturn engine 212 proceeds to a stop state 420.

In this way, the decision overturn engine 212 is capable of having a mathematical score calculated by an appropriately configured scoring model that is associated with the risk of overturning a particular original transaction decision. This numerical score that can be subsequently accessed by a customer service department to provide a more accurate assessment of the risk of overturning the original transaction decision.

Hence, the overturn scoring engine 212 is classifying the risk of overturning the original transaction decline. The classification can then be used by the customer service department as a more empirically determined basis for deciding whether to overturn an original transaction decision in the manner that will be described in greater detail hereinbelow. Once the decision overturn score and thresholds have been determined and recorded in the database 210, this information can be accessed by the customer service module 216 thereby allowing the customer service department to make informed decisions as to whether to overturn an original transaction decision.

Figure 5:
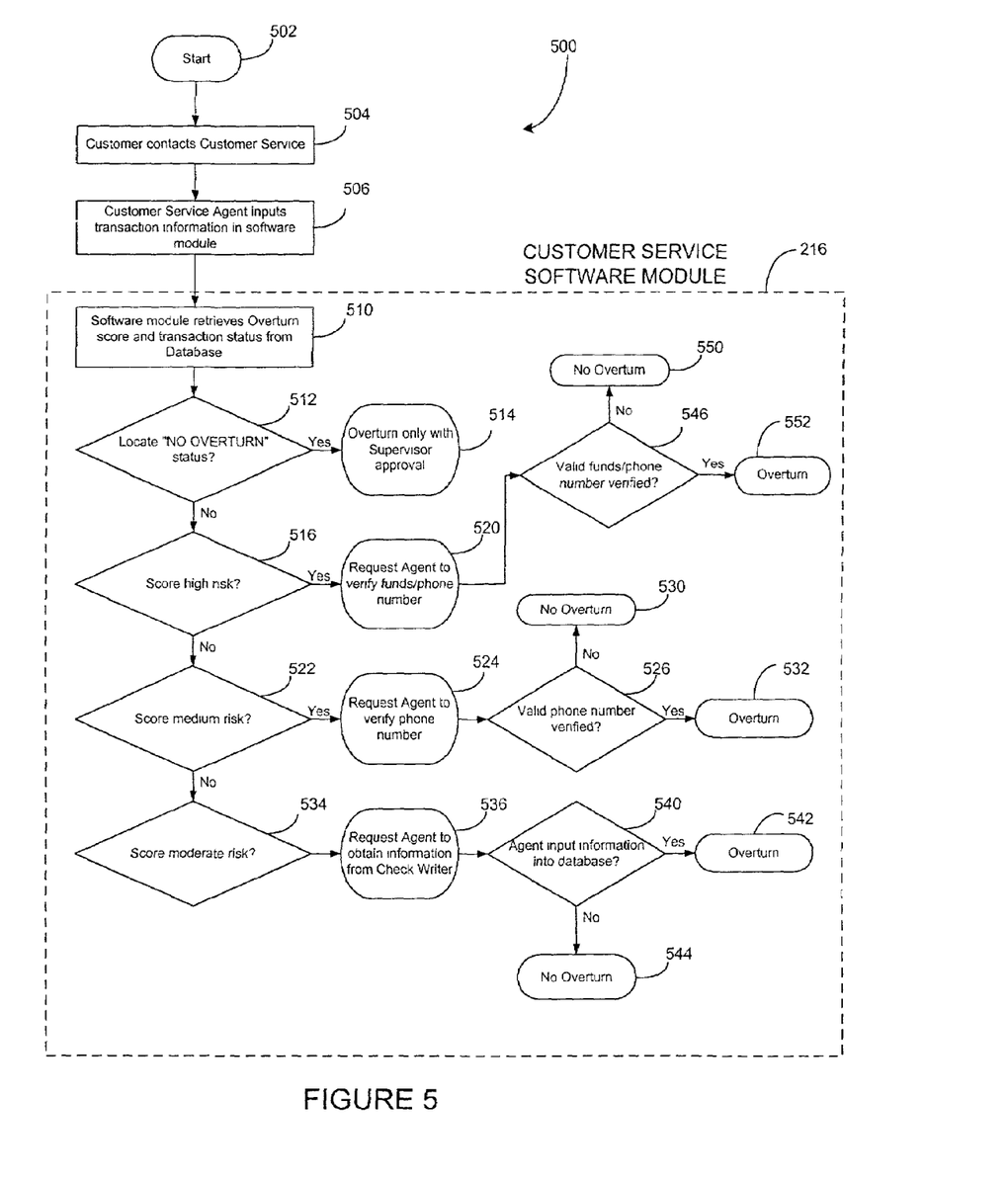
FIG. 5 is a flowchart illustrating an exemplary customer service software module whereby the customer service center of the risk assessment agency can perform an overturn analysis on an initial declined transaction.

FIG. 5 is a flow chart which illustrates the operation of the customer service module as it utilizes the thresholds and overturn score to provide a customer service representative with objective criteria for determining whether to overturn an original transaction decision. The process is as follows: from a start state 502 a particular customer will contact the customer service department in state 504. Typically, the customer will contact the customer service department via telephone and provide information to the customer service department 218 indicative of the transaction that was declined. The customer service agent then inputs the transaction information into the software module in state 506. Typically, this transaction information will include such things as the identifying number of the check (the MICR number, etc.), the merchant at which the transaction was attempted, the amount and any other information that would allow for the identification of the particular transaction that was declined.

Once this information is entered into the customer service software module 216, the module then retrieves, in state 510, the overturn score and the transaction status from the database 210 for the declined transaction. In this particular implementation, the customer service software module 216 is retrieving the overturn status and is determining whether the overturn status indicates that the original transaction decision falls into a plurality of categories that include a no-overturn category, a high risk category, a medium risk category and a moderate risk category. It will be appreciated that any of a number of classifications can be used without departing from the spirit of the present invention. The decision overturn engine 212 has preferably used an overturn scoring model to obtain an overturn score for the particular original risk transaction and has categorized the score into one of these four categories.

The customer service software module 216 initially decides, in decision state 512, whether the overturn engine 212 has categorized the transaction in a no overturn status. In some circumstances, the decision overturn engine 212 may determine that only in very limited circumstances will the decline of an original transaction be overturned. In some circumstances, the variables of Table 3 will indicate that the customer may be engaged in fraudulent check writing transactions. In such circumstances, the overturn score will fall within a no overturn category wherein a no overturn signal will be displayed to the customer service department in state 514. In this implementation, the no overturn message in state 514 indicates that the customer service representative does not have the authorization to overturn the decision and that only a supervisor with appropriate authority can overturn the original transaction decision. In this way, a supervisor with more experience can talk to the customer and make a determination as to whether to overturn the original transaction decision in view of the very high risk overturn score. In another implementation, the system can be set up such that there will be no overturn in this category by either the customer service representative or by anyone else.

If the customer service software module 216 then determines in decision state 516 whether the overturn score is in a high risk category. In this circumstance, the customer service representative may be prompted in state 520 to verify that sufficient funds are available in the customer's account and also to verify the customer's phone number. The customer service software module then determines, in state 546, based upon inputs from the customer service agent, whether the funds and phone number have been verified. If they have been verified, the agent is advised that the original transaction decision is overturned, in state 552, and, if the funds and phone number are not verified, then the agent is advised in state 550 that the transaction is not overturned. Verification of the funds and phone number is generally performed as a result of the customer providing account information and telephone information to the customer service representative which then accesses the database 210 to verify whether the provided information is correct. In this way, attempts to use checks by individuals who either do not have sufficient funds or attempting to use a false identity can be identified.

If the score is not in the high risk category, the customer service module then determines whether the score is in the medium risk category in decision state 522. In this circumstance, the customer service representative may be prompted in state 524 to verify the customer's telephone number. Verification of the telephone number reduces the risk associated with the transaction as it allows for the opportunity to cross check the telephone number against the check identification information to verify that the check writer is an authorized check writer. Moreover, if the check is declined due to insufficient funds, the telephone number provides additional information that the check approval agency can use to collect the funds thereby further reducing the risk of the transaction.

The customer service software module then determines in state 526 based upon inputs from the customer service agent whether the phone number has been verified. If it has been verified, the agent is advised that the original transaction decision is overturned in state 532. If it is not verified, then the agent is advised in state 530 that the transaction is not overturned.

If the score is not in the medium risk category, the customer service software module then determines whether the score is in the moderate risk category in decision state 534. If the score is in the moderate risk category, the customer service software module 216 prompts the customer service agent to obtain additional information from the check writer in state 536. The moderate risk category is a category where the likelihood that the customer is engaged in fraud or would be unable to cover the check is relatively low and the customer service software module is simply requesting additional information such as address information, telephone information, employment information and the like to augment the database to facilitate collection on the check in the event that the customer fails to pay. The customer service software module then determines, in decision state 216, whether this information has been entered in decision state 540 and, if it has been entered, advises the customer service agent to overturn the original transaction decline in state 542. In the event that this information is not entered into the database, the customer service software module 216 will then advise the customer service agent to not overturn the original transaction decline in state 544.

Hence, it will be appreciated that the transaction risk assessment process and system disclosed herein provides a framework for determining risk associated with overturning original transaction declines. This framework provides specific instructions to customer service agents who can then use the instruction when contacted by customers to overturn or not overturn original declines. As the overturn decision is based upon a mathematical calculation of risk, the incidents of the customer service agents erroneously overturning original transaction declines will be decreased which results in less loss to the merchants and the risk assessment agency.

Although the description above contains many specific examples, these should not be construed as limiting the scope and merely provide illustrations of some of the presently preferred embodiments. Thus, the scope of the invention should be determined by the following claims rather than by the examples given.

What is claimed is:

1. A system for re-evaluating risk in financial transactions, the system comprising at least one memory for storing data and computer-executable instructions, and at least one processor configured to access the at least one memory and further configured to execute the computer-executable instructions the system further comprising:
    a risk scoring engine, comprising a plurality of risk scoring models, that evaluates, by the at least one processor, risk in an original financial transaction wherein a customer is attempting to pay for vendibles using a promissory payment and wherein the risk scoring engine uses a first scoring model to assess the risk of the original financial transaction based on first transaction variables and provides a first signal to the point of sale indicating that the promissory payment by the customer in the original financial transaction be declined when the risk exceeds a pre-selected threshold;
    a decision overturn scoring engine, comprising a plurality of overturn scoring models, that, upon a decline, evaluates, by the at least one processor, the risk of overturning the decline using a second scoring model from the plurality of overturn scoring models, wherein the overturn scoring engine classifies the risk of overturning the original decline based on one or more second transaction variables, the second transaction variables including at least a second transaction variable indicative of a request to overturn the decline, and provides an overturn classification signal indicative thereof of the risk of overturning the original decline; and
    a customer service module that receives, by the at least one processor, the overturn classification signal from the overturn scoring engine and provides the signal to a customer service representative such that when and if the customer service representative receives a request from a customer to overturn the decline of promissory payment in the original transaction, the customer service representative utilizes the overturn classification signal to decide whether to overturn the original decline.

2. The system of claim 1, further comprising a point of sale transmission device that transmits data about the original financial transaction to the risk scoring engine and wherein the point of sale transmission device receives the signal from the risk scoring engine to communicate an acceptance or decline of the original financial transaction.

3. The system of claim 1, wherein the promissory payment comprises a check.

4. The system of claim 1, further comprising a database and wherein the decision overturn engine stores the overturn classification signals in the database for subsequent access by the customer service module.

5. The system of claim 1, wherein the plurality of overturn scoring models provide an overturn score that is used by the decision overturn engine to generate the overturn classification signals.

6. The system of claim 5, wherein the plurality of overturn scoring models utilize a plurality of second transaction variables and weight the plurality of second transaction variables in order to generate the overturn score.

7. The system of claim 6, wherein the plurality of second transaction variables include variables indicative of a check writing history of the customer, variables indicative of the transaction type and variables indicative of the modeled risk of the transaction.

8. The system of claim 7, wherein the second transaction variables further include a variable indicative of a percentage variation between a threshold value needed for the risk scoring engine to accept the promissory payment and an actual score determined for the original transaction.

9. The system of claim 1, wherein the overturn classification signals comprises a no overturn signal which indicates to the customer service representative that the original transaction decision is not to be overturned without supervisor approval.

10. The system of claim 1, wherein the overturn classification signal comprises a high risk signal that indicates to the customer service representative that the original transaction decision is only to be overturned if the funds to cover the transaction are verified and if a telephone number of the check writer is verified.

11. The system of claim 1, wherein the overturn classification signal comprises a medium risk signal that indicates to the customer service representative that the original transaction decision can only be overturned if the customer service representative verifies a telephone number of the customer.

12. The system of claim 1, wherein the overturn classification signal comprises a moderate risk score that indicates to the customer service representative that the original transaction decision can only be overturned if the customer provides additional identification details to the customer service representative.

13. A computer-implemented method of evaluating, by one or more computer processors, the risk of accepting a promissory payment as payment for a vendible good or service, the method comprising:
    transmitting transaction information from a point of sale to a risk scoring engine wherein the transaction information includes identifying information about the promissory payment;
    evaluating, by the one or more computer processors, the transaction information using a risk engine, comprising a plurality of risk scoring models, to assess the risk of accepting the promissory payment as payment for the vendible;
    declining to accept the promissory payment when the evaluation of the transaction information indicates that the assessed risk of accepting the promissory payment exceeds a selected threshold;
    transmitting the decline to accept the promissory payment to the point of sale;
    performing, by the one or more computer processors, a decision overturn evaluation, upon a decline, using an overturn engine, comprising a plurality of overturn scoring models, to classify the risk associated with overturning an original decline to accept the promissory payment based at least in part on a factor indicating a request to overturn the decline; and
    transmitting, by the one or more computer processors, the classification of the risk associated with overturning the original decline to a customer service representative so that when and if the customer service representative is contacted by a customer to overturn the original decline, the customer service representative can make the overturn decision based at least in part on the classification of risk performed by the overturn engine.

14. The method of claim 13, wherein transmitting transaction information from a point of sale comprises transmitting via an interface data about a check payment for goods or services.

15. The method of claim 13, wherein evaluating the transaction information to assess the risk of accepting the promissory payment comprises selecting one of the plurality of risk scoring models and evaluating the risk by inputting variables received in the transmission act into the scoring model.

16. The method of claim 13, wherein performing a decision overturn evaluation using an overturn engine comprises utilizing one of the plurality of overturn scoring models to determine the risk associated with overturning the original decision to decline the promissory payment.

17. The method of claim 16, wherein the plurality of overturn scoring models utilize a plurality of variables and weight the variables in order to generate an overturn score and wherein the overturn score is used to classify the risk.

18. The method of claim 17, wherein the plurality of variables include variables indicative of a previous check writing history of the customer, variables indicative of the transaction type and variables indicative of the modeled risk of the transaction.

19. The method of claim 18, wherein the variables further include a variable indicative of a percentage variation between the threshold value needed for the risk scoring engine to accept the promissory payment and the actual score determined for the original transaction.

20. The method of claim 13, wherein the risk of overturning the original decline is classified into one of a plurality of risk categories that include a no overturn signal which indicates to the customer service representative that the original transaction decision is not to be overturned.

21. The method of claim 13, wherein the risk of overturning the original decline is classified into one of a plurality of risk categories that include a very high risk category that indicates to the customer service representative that the original transaction decision is only to be overturned by a supervisor.

22. The method of claim 21, wherein the risk of overturning the original decline is classified into one of a plurality of risk categories that include high risk category that indicates to the customer service representative that the original transaction decision can only be overturned if the customer service representative verifies funds are available to cover the transaction and verifies a telephone number of the customer.

23. The method of claim 22, wherein the risk of overturning the original decline is classified into one of a plurality of risk categories that include a moderate risk category that indicates to the customer service representative that the original transaction decision can only be overturned if the customer provides additional identification details to the customer service representative.

24. A system for determining whether to overturn an original decision to decline to accept a promissory payment in a financial transaction, the system comprising at least one memory for storing data and computer-executable instructions, and at least one processor configured to access the at least one memory and further configured to execute the computer-executable instructions, the system further comprising:

an overturn scoring engine, comprising a plurality of overturn scoring models, that receives data about the promissory payment and the financial transaction after the promissory payment has been declined, wherein the overturn scoring engine evaluates, via the at least one processor, a number of factors contained within the data, including at least one factor indicative of a request to overturn the original decision, to obtain an overturn score and wherein the overturn scoring engine classifies the overturn score into one of a plurality of classifications and generates a classification signal indicative thereof;

a database wherein the overturn scoring engine stores the classification signal in the database for subsequent access; and a customer service module that permits access to the classification signal such that a customer service representative, using the customer service module, can access the classification signal when and if asked by a customer to overturn the original decision to decline to accept the promissory payment.

25. The system of claim 24, wherein the plurality of overturn scoring models provide an overturn score that is used by the decision overturn engine to generate the overturn classification signal.

26. The system of claim 25, wherein the plurality of overturn scoring models utilize a plurality of variables and weight the variables in order to generate the overturn score.

27. The system of claim 26, wherein the plurality of variables include variables indicative of a previous check writing history of the customer, variables indicative of the transaction type and variables indicative of the modeled risk of the transaction.

28. The system of claim 27, wherein the variables further include a variable indicative of a percentage variation between a threshold value needed for the risk scoring engine to accept the promissory payment and an actual score determined for the original transaction.

29. The system of claim 24, wherein the overturn classification signal comprises a no overturn signal which indicates to the customer service representative that the original transaction decision is not to be overturned.

30. The system of claim 24, wherein the overturn classification signal comprises a high risk signal that indicates to the customer service representative that the original transaction decision can only be overturned if the customer service representative verifies funds are available to cover the transaction and verifies a telephone number of the customer.

31. The system of claim 24, wherein the overturn classification signal comprises a moderate risk score that indicates to the customer service representative that the original transaction decision can only be overturned if the customer provides additional identification details to the customer service representative.

* * * * *

UNITED STATES PATENT AND TRADEMARK OFFICE
CERTIFICATE OF CORRECTION

PATENT NO.       : 7,653,590 B1  
APPLICATION NO.  : 10/047917  
DATED            : January 26, 2010  
INVENTOR(S)      : Kroon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1714 days.

Signed and Sealed this

Twenty-third Day of November, 2010

David J. Kappos  
*Director of the United States Patent and Trademark Office*